US010501094B2

(12) United States Patent
Duke

(10) Patent No.: US 10,501,094 B2
(45) Date of Patent: Dec. 10, 2019

(54) SYSTEM AND METHOD FOR HIGH-VELOCITY GROUND TRANSPORTATION MOBILE WIND POWER GENERATION

(71) Applicant: Larry Duke, Kennesaw, GA (US)

(72) Inventor: Larry Duke, Kennesaw, GA (US)

( * ) Notice: Subject to any disclaimer, the term of this patent is extended or adjusted under 35 U.S.C. 154(b) by 72 days.

(21) Appl. No.: 15/902,964

(22) Filed: Feb. 22, 2018

(65) Prior Publication Data

US 2018/0237035 A1 Aug. 23, 2018

Related U.S. Application Data

(60) Provisional application No. 62/462,069, filed on Feb. 22, 2017.

(51) Int. Cl.
| | | |
|---|---|---|
| *B61C 3/00* | (2006.01) | |
| *F03D 9/32* | (2016.01) | |
| *B61C 1/10* | (2006.01) | |
| *F03D 9/25* | (2016.01) | |
| *B61B 13/00* | (2006.01) | |
| *F01K 15/02* | (2006.01) | |

(52) U.S. Cl.
CPC ............... *B61C 3/00* (2013.01); *B61B 13/00* (2013.01); *B61C 1/10* (2013.01); *F01K 15/025* (2013.01); *F03D 9/25* (2016.05); *F03D 9/32* (2016.05); *F05B 2240/9113* (2013.01); *F05B 2240/941* (2013.01); *Y02E 10/725* (2013.01); *Y02E 10/728* (2013.01)

(58) Field of Classification Search
CPC ..... B61C 3/00; B61C 1/10; F03D 9/25; F03D 9/32; B61B 13/00; F01K 15/025; F05B 2240/9113; F05B 2240/941
See application file for complete search history.

(56) References Cited

U.S. PATENT DOCUMENTS

| | | | | |
|---|---|---|---|---|
| 7,427,173 | B2 * | 9/2008 | Chen ......................... | B60L 8/00 290/44 |
| 2009/0032350 | A1 * | 2/2009 | Shapery .................. | B60L 5/005 191/10 |
| 2013/0039755 | A1 * | 2/2013 | Holley ...................... | F03D 9/00 415/213.1 |
| 2014/0000473 | A1 * | 1/2014 | Miller ..................... | B61C 11/06 104/138.1 |
| 2014/0196446 | A1 * | 7/2014 | Holley ...................... | F03D 9/00 60/398 |
| 2018/0237035 | A1 * | 8/2018 | Duke ........................ | B61C 3/00 |
| 2019/0093631 | A1 * | 3/2019 | Lee ......................... | F03D 7/0248 |

* cited by examiner

*Primary Examiner* — Jason C Smith
(74) *Attorney, Agent, or Firm* — Incorporating Innovation LLC; Charlena Thorpe, Esq.

(57) ABSTRACT

Implementations of a system and method for high-velocity ground transportation mobile wind power generation are provided. In some implementations, the system comprises a pathway system, a large-scale high-velocity ground transporter, a plurality of on-board turbine-generators, and a plurality of off-board turbine-generators. In some implementations, the method comprises providing the system and generating electricity on-board and off-board the transporter with the system.

15 Claims, 9 Drawing Sheets

SYSTEM AND METHOD FOR HIGH-VELOCITY GROUND TRANSPORTATION MOBILE WIND POWER GENERATION

CROSS REFERENCE TO RELATED APPLICATION

This application claims the benefit of U.S. Patent Application Ser. No. 62/462,069, which was filed on Feb. 22, 2017, and is incorporated herein by reference in its entirety.

TECHNICAL FIELD

This disclosure relates to implementations of a system and method for high-velocity ground transportation mobile wind power generation.

BACKGROUND

The economic development and growth of a nation is often based on the nation's infrastructure. Key aspects of such infrastructure are the transportation, energy, and information industries. Usually, the information industry forges ahead in technology and innovation, while the energy and transportation industries lag behind in such development.

For example, the railroad transportation industry hasn't changed much in nearly a century. Furthermore, the renewable energy industry has had insufficient development and success, while 86% of the world's electricity is still produced by carbon-fueled generation and 58%-60% of the world's pollution related to climate change is deemed to originate from the energy and transportation industries.

DETAILED DESCRIPTION

Implementations of a system and method for high-velocity ground transportation mobile wind power generation are provided. In some implementations, the system comprises a pathway system, a large-scale high-velocity ground transporter, a plurality of on-board turbine-generators, and a plurality of off-board turbine-generators.

In some implementations, the method comprises providing the system comprising the pathway system, the large-scale high-velocity ground transporter, the plurality of on-board turbine-generators, and the plurality of off-board turbine-generators, and generating electricity on-board and off-board the transporter with the system.

In some implementations, an opposing wind force from a high-velocity ground transportation system may be used to generate electricity. In some implementations, the mass flow rate of opposing air produced by movement of a high-velocity ground transportation system may be used to generate wind forces sufficient to produce electricity.

In some implementations, a mobile system and method for generating electricity using a high-velocity ground transportation system according to the present disclosure may be large-scale and globally scalable.

In some implementations, a mobile system and method for generating electricity using a high-velocity ground transportation system according to the present disclosure may be sustainable.

In some implementations, a mobile system and method for generating electricity using a high-velocity ground transportation system according to the present disclosure may be renewable energy. In some implementations, a mobile system and method for generating electricity using a high-velocity ground transportation system according to the present disclosure may be general zero-carbon renewable energy.

In some implementations, a mobile system and method for generating electricity using a high-velocity ground transportation system according to the present disclosure may combine high velocity wind forces and wind kinetic energy through thrust provided by the latest technologies in steam turbines, with the growing demand for high-velocity transit. In some implementations, a mobile system and method for generating electricity using a high-velocity ground transportation system according to the present disclosure may combine a measurable mass flow rate of passing air created by the movement generated through the latest technologies in steam turbines, with the growing demand for high-velocity transit.

Figure 1:
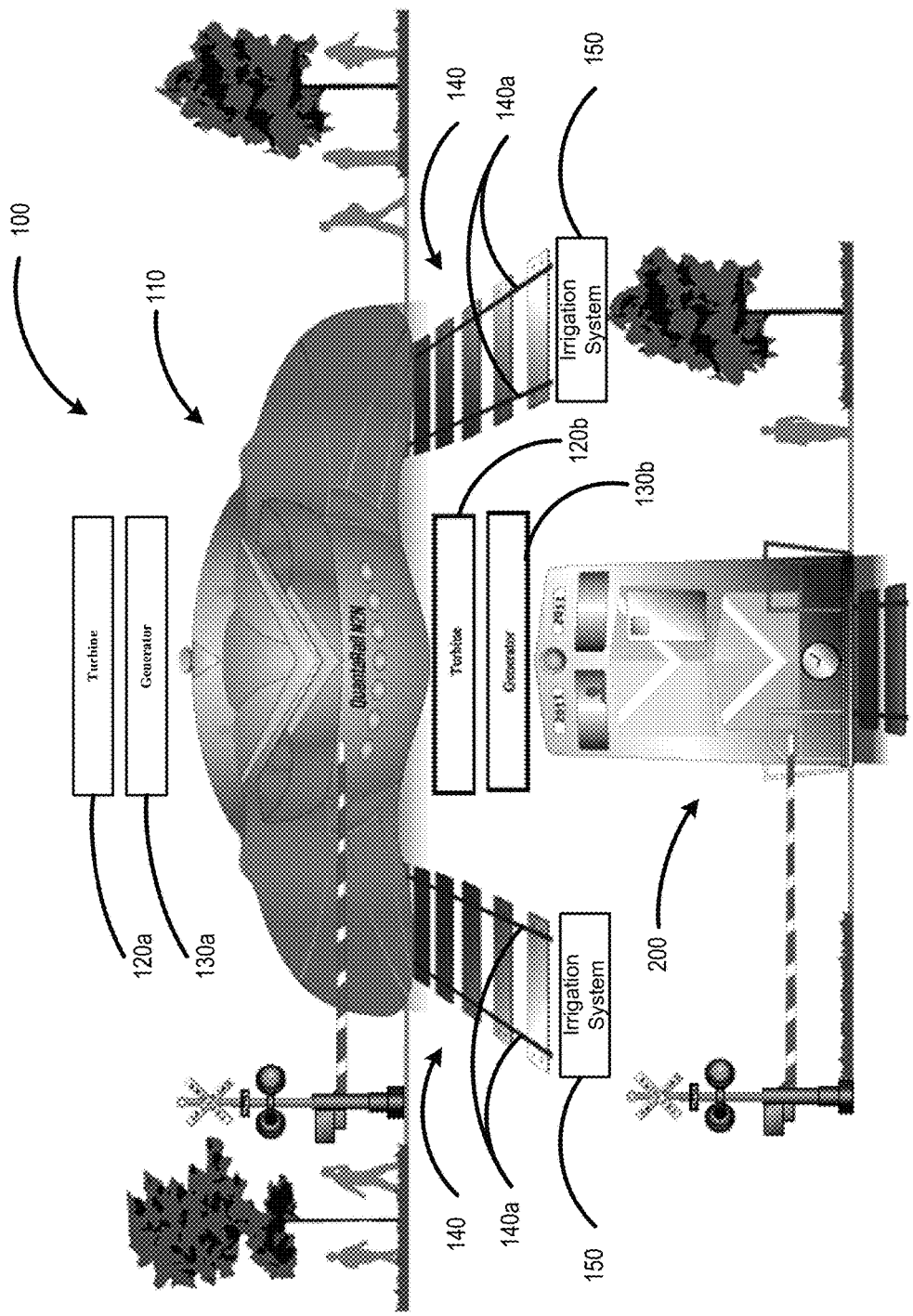
FIG. 1 illustrates an implementation of an example high-velocity ground transportation system according to the present disclosure shown in contrast to a current/existing rail system.

FIG. 1 illustrates an example implementation of a high-velocity ground transportation system 100 according to the present disclosure shown in contrast to a current/existing rail system 200. In some implementations, the high-velocity ground transportation system 100 comprises a transporter/train/vehicle 110, on-board wind turbines 120a and generators 130a, off-board wind turbines 120b and generators 130b, and tracks/pathway system 140. In some implementations, the high-velocity ground transportation system 100 further comprises an irrigation system 150

As shown in FIG. 1, in some implementations, the transporter 110 comprises a much wider wheel base than a current/existing rail system 200 or roadway vehicles. As shown in FIG. 10B, in some implementations, the wheelbase of the transporter 110 is at least 20 feet wide.

Figure 7:
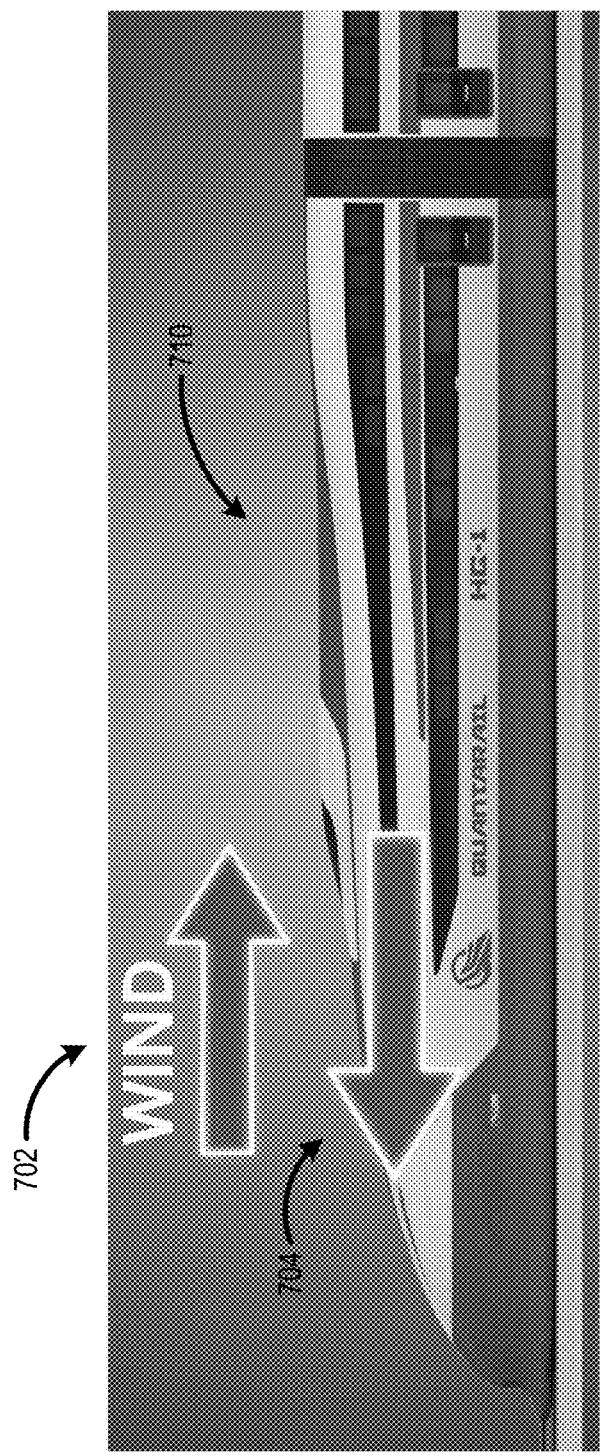
FIG. 7 illustrates an example opposing wind force and opposing wind flow velocity with respect to a transporter of a high-velocity ground transportation system according to the present disclosure.

As shown in FIG. 7, in some implementations, the high-velocity ground transportation system 100 generates electricity on-board and off-board a transporter 710 based on an opposing wind force 702 and an opposing wind flow velocity 704. For example, in some implementations, on-board electricity generation is acquired through a series of channeled venturi air-duct control systems (not shown).

In some implementations, off-board electricity generation is acquired by channeling a controlled wind flow velocity 704 traveling underneath the transporter 710 as it moves down the tracks/pathway 140 and over the stationary off-board wind turbines 120b and generators 130b (as discussed below).

In some implementations, the high-velocity ground transportation system 100 generates electricity based on the opposing mass flow rate of the wind flow velocity 704 traveling underneath the transporter 710 as it moves down the tracks/pathway 140 and over a perpendicular portion of the off-board wind turbines 120b and generators 130b. As the transporter 710 moves down the tracks/pathway 140, the opposing wind force 702 spins the on-board turbines 120 which in turn operates the on-board generators 130a and produces electricity.

In some implementations, the transporter 110, 710 (e.g., nose design, undercarriage design) is configured to create a desired wind control. In some implementations, the transporter 110, 710 is configured to create the wind force 702 and/or the wind flow velocity 704 in a specific direction. In some implementations, the transporter 110, 710 is configured to create the wind force 702 and/or the wind flow velocity 704 with a specific force. In some implementations, the transporter 110, 710 is configured to provide speed and direction for maximum application of the mass flow rate of air 704 to impend the perpendicular cross section of the exposed stationary wind turbines 120b. In some implementations, the transporter 110, 710 is configured to maximize an application of the opposing wind force 702 and/or the opposing wind flow velocity 704 impended respectively on the turbines 120a, 120b to maximize the generating of electricity by the respective generators 130a, 130b.

In some implementations, the transporter 110, 710 is powered by the steam turbines 202, 802. In some implementations, the steam turbines 202, 802 are configured to power the transporter 110, 710 to travel on the pathways 140. In some implementations, the transporter 110, 710 may be powered by any other suitable means such as nuclear, thorium, compressed natural gas, batteries, electricity, diesel, or any other means. In some implementations, the steam turbines 202, 802 are powered by steam produced on-board the transporter 110, 710 from electricity generated by the on-board turbines 120a and generators 120b. In some implementations, the steam turbines 202, 802 mechanically power the transporter 110, 710 to travel on the pathways 140.

Figure 2:
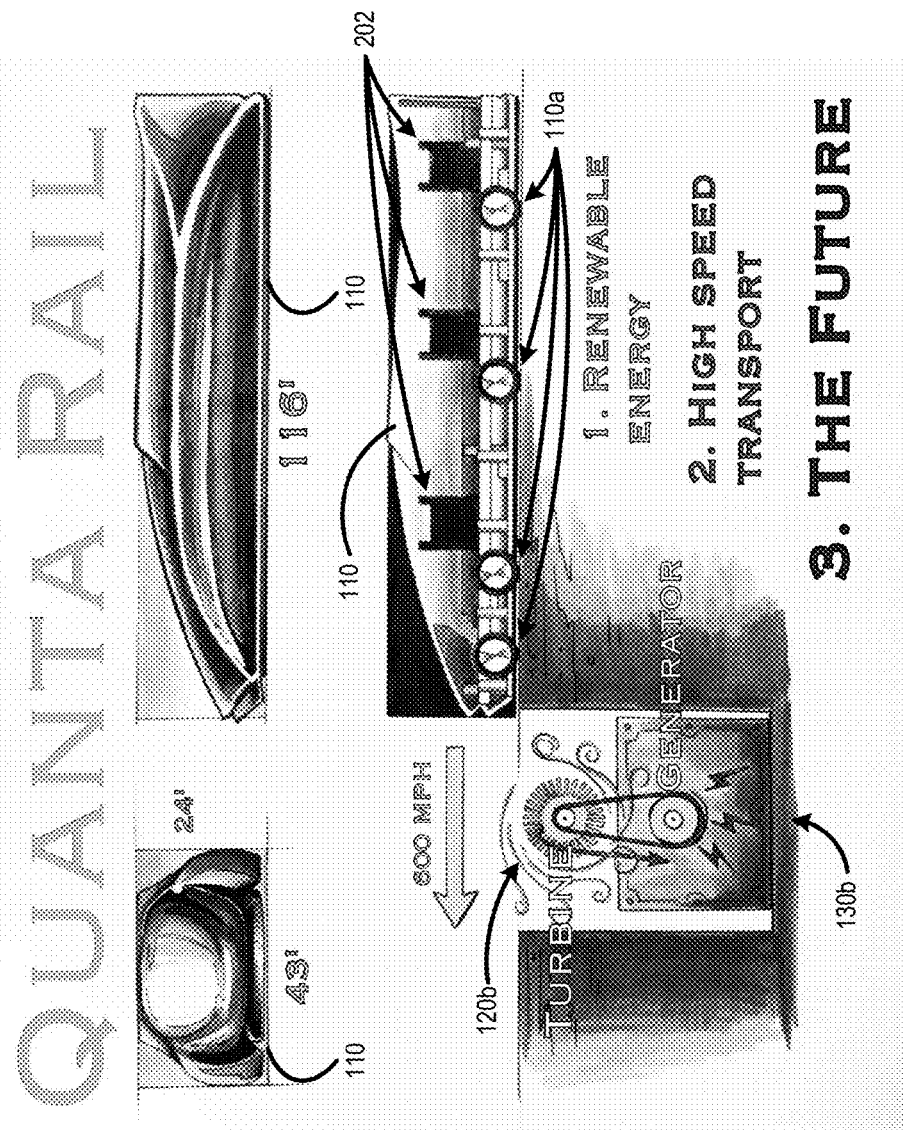
FIG. 2 illustrates example aspects of a high-velocity ground transportation system according to the present disclosure.
Figure 8:
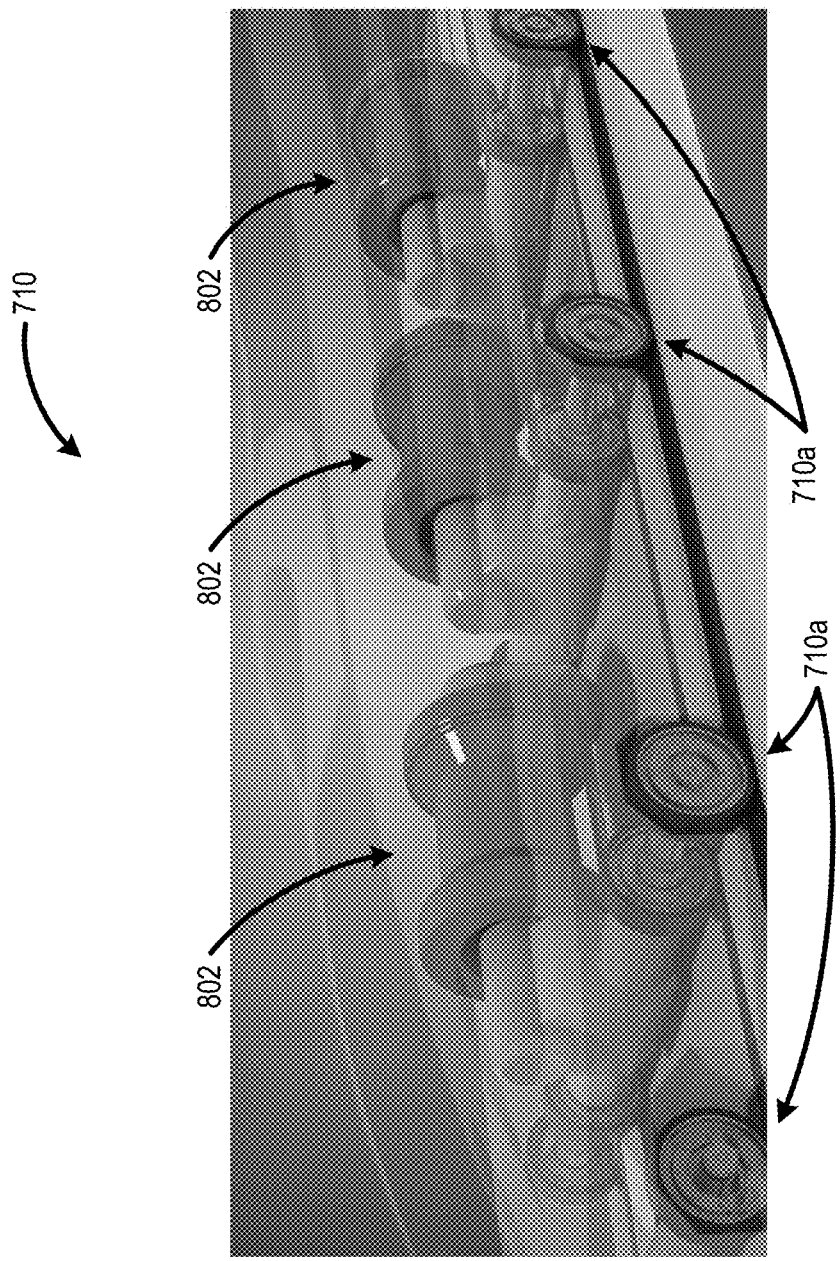
FIG. 8 illustrates an implementation of example steam turbines of a high-velocity ground transportation system according to the present disclosure.

In some implementations, the transporter 110, 710 is configured to operate using steam turbines. FIGS. 2 and 8 illustrate an implementation of example steam turbines 202, 802 on a transporter 110, 710. In some implementations, a transporter 110, 710 is configured to operate using one steam turbine 202, 802. In some implementations, a transporter 110, 710 is configured to operate using three (3) steam turbines 202, 802. In some implementations, a transporter 110, 710 is configured to operate using less than three (3) turbines 202, 802. In some implementations, a transporter 110, 710 is configured to operate using more than three (3) turbines 202, 802.

In some implementations, a transporter 110, 710 is configured to operate using 20 megawatt (MW) steam turbines 202, 802. In some implementations, a transporter 110, 710 is configured to operate using larger MW steam turbines 202, 802. In some implementations, a transporter 110, 710 is configured to operate using less MW turbines 202, 802.

In some implementations, a transporter 110, 710 is configured to travel up to 600 mph. In some implementations, a transporter 110, 710 is configured to travel more than 600 mph. In some implementations, a transporter 110, 710 is configured to travel less than 600 mph.

In some implementations, the transporter 110 is configured to carry passengers and/or cargo. As shown in FIG. 2, in some implementations, a transporter 110, 710 may be 24 feet in height. In some implementations, a transporter 110, 710 may be less than 24 feet in height. In some implementations, a transporter 110, 710 may be greater than 24 feet in height.

In some implementations, a transporter 110, 710 may be 43 feet in width. In some implementations, a transporter 110, 710 may be less than 43 feet in width. In some implementations, a transporter 110, 710 may be greater than 43 feet in width.

In some implementations, a transporter 110, 710 may be 116 feet in length. In some implementations, a transporter 110, 710 may be less than 116 feet in length. In some implementations, a transporter 110, 710 may be greater than 116 feet in length.

Figure 5:
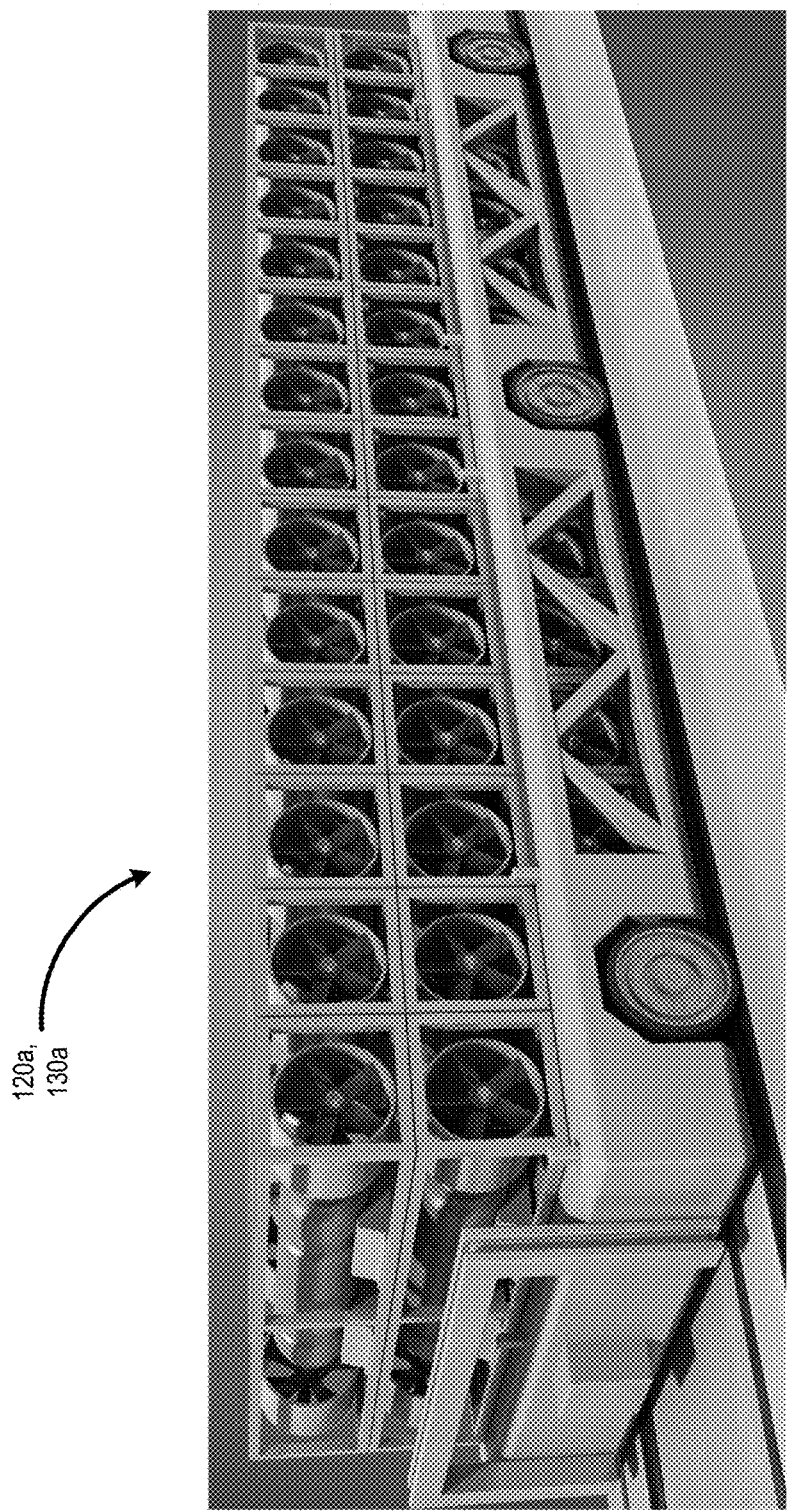
FIG. 5 illustrates an implementation of example on-board wind turbines and generators of a high-velocity ground transportation system according to the present disclosure.

In some implementations, the high-velocity ground transportation system 100 comprises wind turbines 120a and generators 130a installed on-board the transporter 110. In some implementations, the on-board turbines 120a and generators 130a compose on-board turbine-generators of the ground transportation system 100. In some implementations, the on-board turbines 120a and generators 130a are configured to generate electricity on-board the transporter 110 as the on-board turbine-generators. FIG. 5 illustrates an implementation of example on-board wind turbines 120a and generators 130a of a high-velocity ground transportation system (e.g., system 100) of according to the present disclosure.

In some implementations, the high-velocity ground transportation system 100 comprises wind turbines 120b and generators 130b installed off-board the transporter 110 between the tracks/pathway system 140. In some implementations, the off-board turbines 120b and generators 130b compose off-board turbine-generators of the ground transportation system 100. In some implementations, the off-board turbines 120b and generators 130b are configured to generate electricity off-board the transporter 110 as the off-board turbine-generators.

As shown in FIG. 2, in some implementations, the off-board turbines 120b and the off-board generators 130b are positioned in a vertical orientation with the off-board turbines 120b positioned above the respective off-board generators 130b. In some implementations, the off-board wind turbines 120b are installed partially underneath the ground above the off-board generators 130b. In some implementations, the off-board turbines 120b and/or the off-board generators 130b are installed in-ground.

In some implementations, the off-board turbines 120b and generators 130b may be installed in-ground every 100 feet along a pathway 140. In some implementations, the turbines 120 and generators 130 may be installed in-ground less than every 100 feet. In some implementations, the off-board turbines 120b and generators 130b may be installed in-ground more than every 100 feet.

In some implementations, the turbines 120a, 120b are operatively connected to the generators 130a, 130b, respectively. In some implementations, the turbines 120a, 120b are affixed to the respective shafts of the generators 130a, 130b so that the generators 130a, 130b are direct-driven. In some implementations, the generators 130a, 130b may be belt-driven. In some implementations, the generators 130a, 130b may be chain-driven. In some implementations, the generators 130a, 130b may be gear-driven. In some implementations, the generators 130a, 130b are turbo-generators.

In some implementations, the turbines 120a, 120b may be wind turbines. In some implementations, the turbines 120a, 120b are perpendicular cross section turbines. In some implementations, the outer surface of the turbines 120a, 120b may be solid. In some implementations, the outer surface of the turbines 120a, 120b may not be solid. In some implementations, the turbines 120a, 120b are configured such that wind does not pass through the turbine blades. In some implementations, the turbines 120a, 120b are configured such that wind passes through the turbines 120a, 120b. In some implementations, the turbines 120a, 120b are configured such that wind passes over the turbines 120a, 120b to rotate the generators 130a, 130b.

As shown in FIGS. 2 and 5, in some implementations, the shafts of the turbines 120a, 120b extend horizontally. In some implementations, the rotational shafts of the turbines 120a, 120b extends vertically. In some implementations, the rotational shafts of the turbines 120a, 120b extends horizontally. In some implementations, the turbines 120a, 120b and generators 130a, 130b may have dual rotation capabilities.

In some implementations, the pathway system 140 includes one or more pathways, each pathway having a starting point and an ending point. In some implementations, the pathways are between two cites, between two states, or between two countries.

Figure 9:
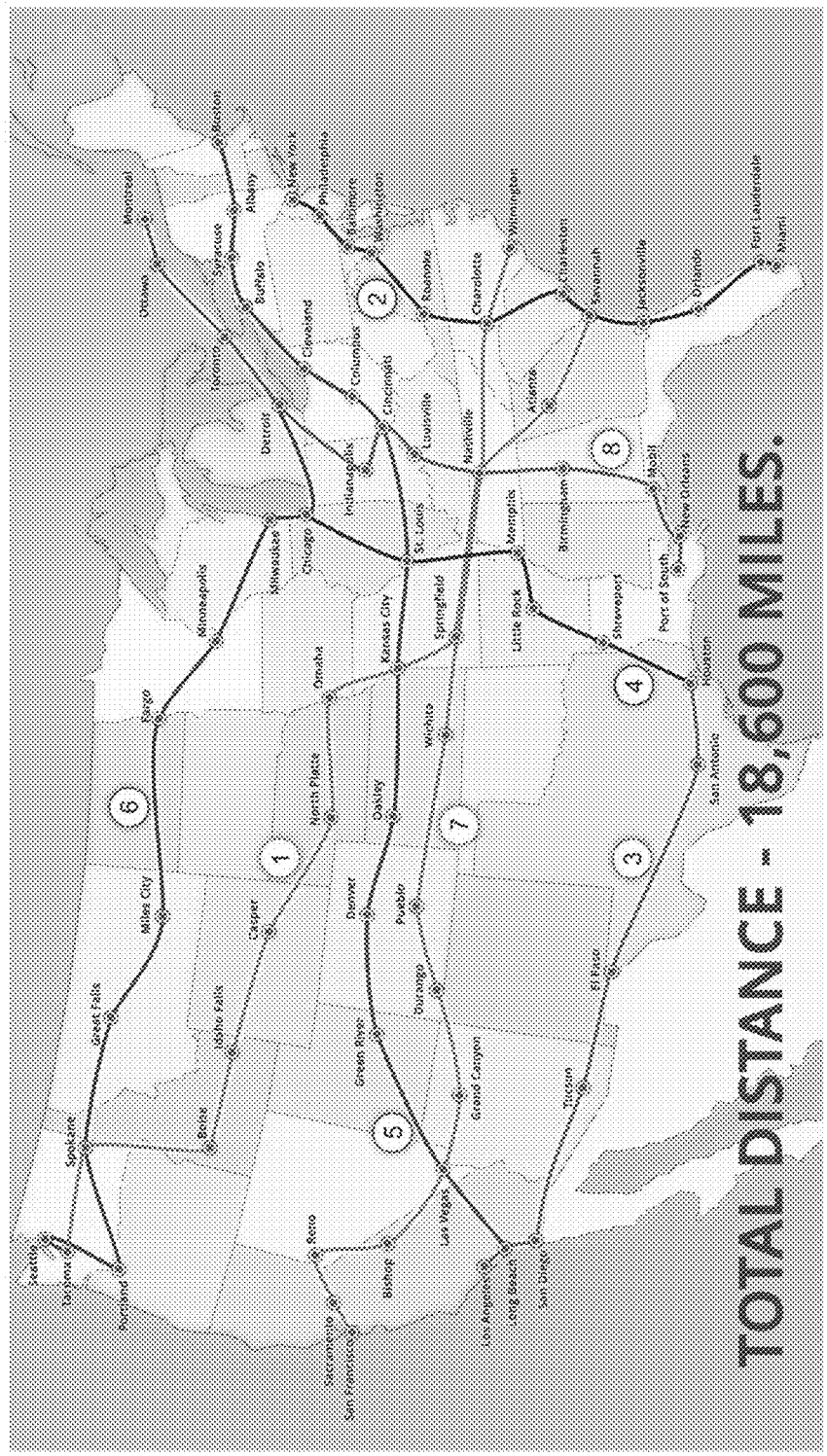
FIG. 9 illustrates an implementation of example locations of a pathway system according to the present disclosure.

FIG. 9 illustrates an implementation of example pathways of the pathway system 140. In some implementations, the pathway system 140 may be constructed in any suitable location. In some implementations, the pathway system 140 may be constructed into existing interstate medians. In some implementation the pathway system 140 may be constructed onto federal highway routes. In some implementations, the pathway system 140 may be constructed using existing railroad right of ways. In some implementations, existing railroad tracks may be modified.

Figure 10A:
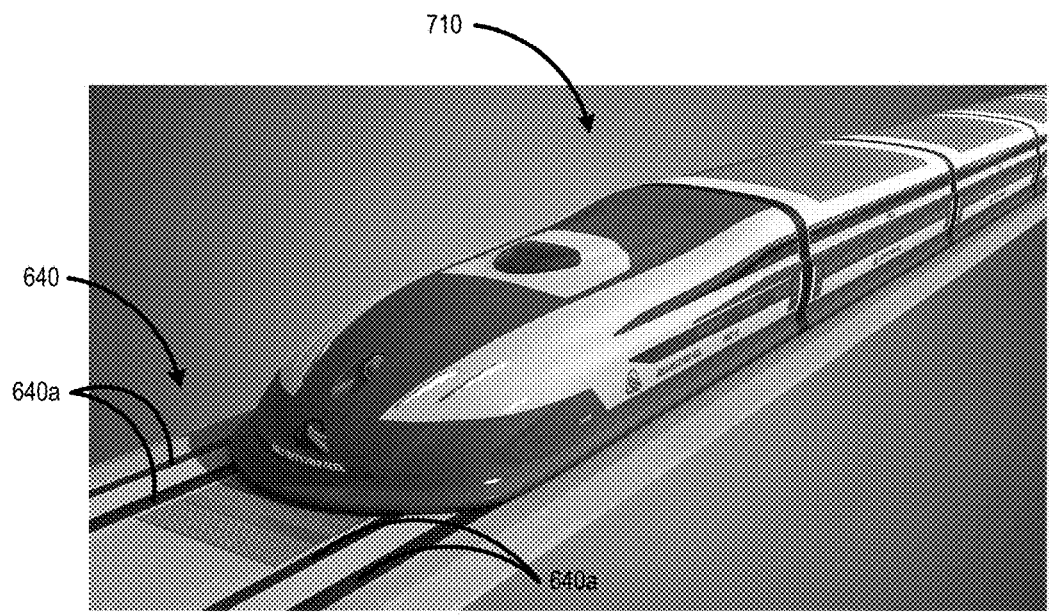
FIGS. 10A and 10B illustrate another example of aspects of a high-velocity ground transportation system according to the present disclosure.
Figure 10B:
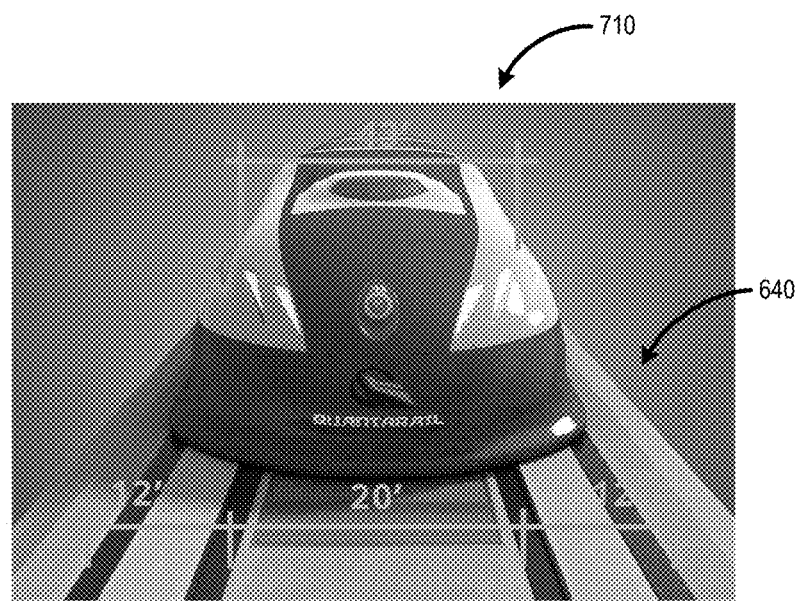

In some implementations, as shown in FIGS. 1 and 10A, the one or more pathways of the pathway system 140, 640 each comprise one or more parallel tracks 140a, 640a configured to support and guide the transporter 110, 710. In some implementations, as shown in FIGS. 2 and 8, the transporter 110, 710 comprises one or more wheels 110a, 710a configured to be supported and guided by the tracks 140a, 640a of the pathway system 140, 640.

In some implementations, the pathway system 140, 640 may include no steel or concrete. In some implementations, the pathway system 140, 640 may include steel and/or concrete. In some implementations, the pathway system 140, 640 may not include conventional railroad steel rails. In some implementations, the pathway system 140, 640 may include conventional railroad steel rails.

Figure 3:
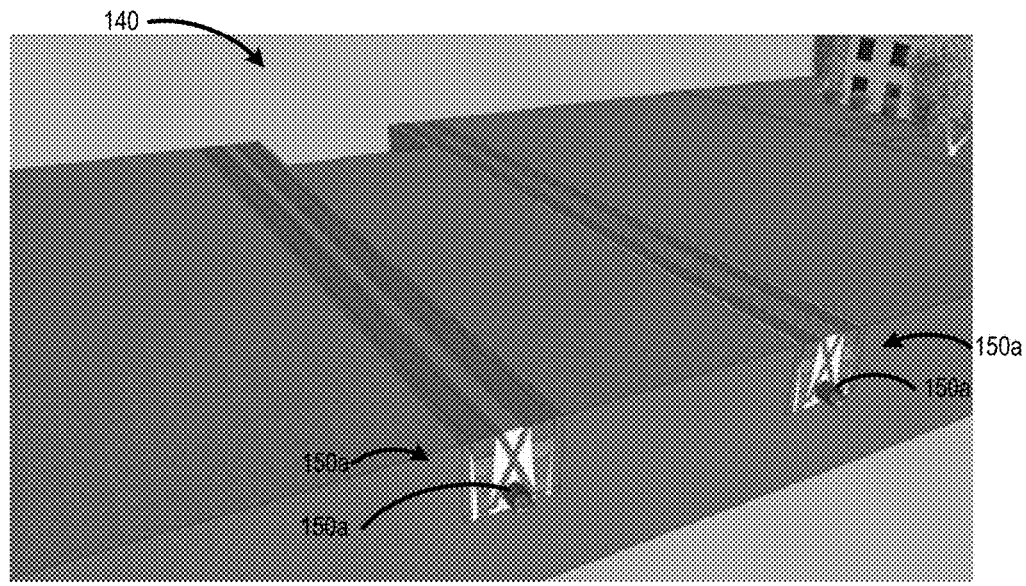
FIG. 3 illustrates an implementation of an example track/pathway system and an example irrigation system of a high-velocity ground transportation system according to the present disclosure.
Figure 4:
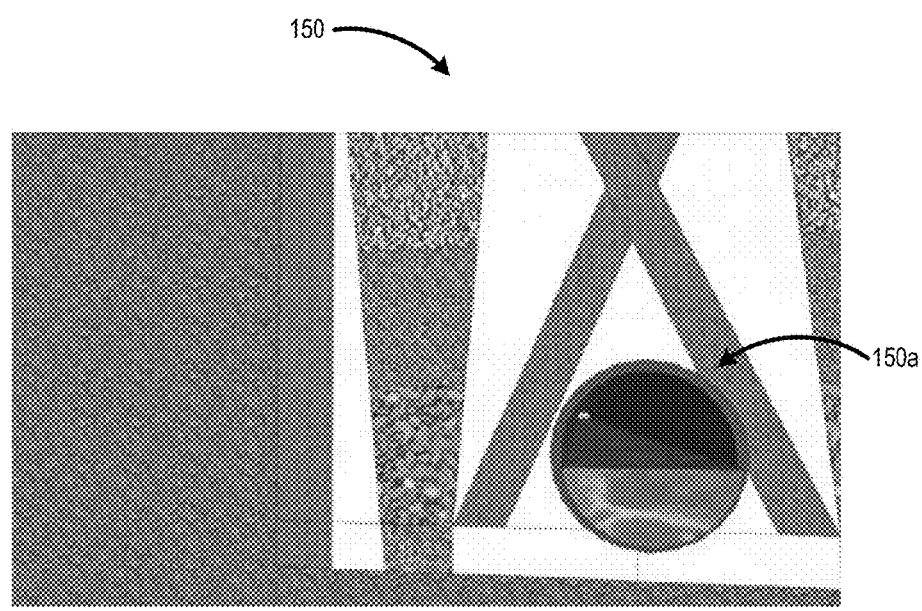
FIG. 4 further illustrates the example irrigation system shown in FIG. 3.
Figure 6:
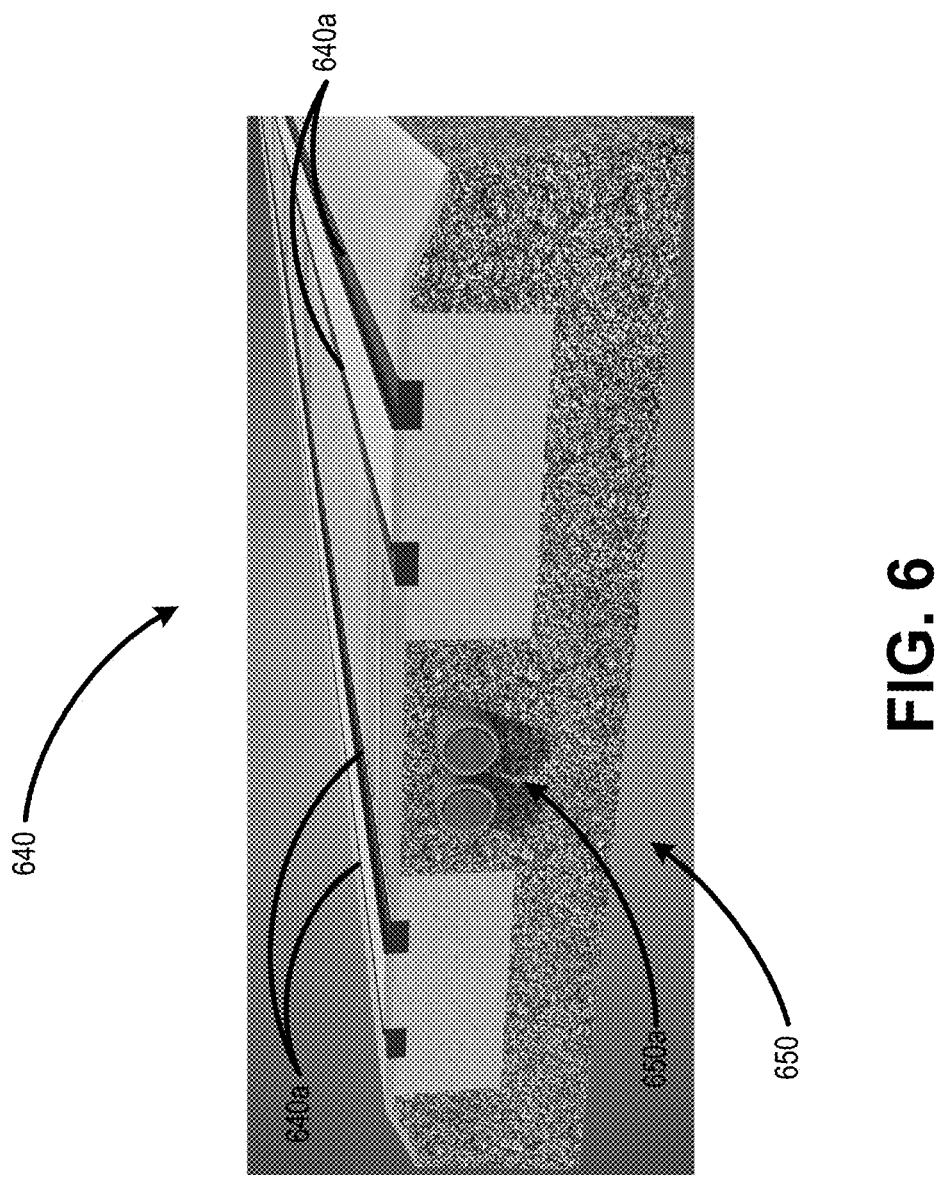
FIG. 6 illustrates another implementation of a track/pathway system and the irrigation system of a high-velocity ground transportation system according to the present disclosure.

FIGS. 3 and 4 illustrate an implementation of an example track/pathway system 140 and an example irrigation system 150 of a high-velocity ground transportation system 100 according to the present disclosure. FIG. 6 illustrates another implementation of a track/pathway system 640 and irrigation system 650 of a high-velocity ground transportation system according to the present disclosure.

In some implementation, the irrigation system 150, 650 includes one or more pipes 150a, 650a traveling down the length or a portion of the one or more pathways 140, 640 for carrying water and/or other matter. In some implementations, the pipes 150a, 650a are embedded within the pathway 140, 640. In implementations, the one or more pipes are under a pathway 140 or adjacent to a pathway.

In some implementations, the pipes 150a, 650a are configured to carry potable water, irrigation water, or flood drainage water. In some implementations, the pipes 150a, 650a may be 72 inches in diameter. In some implementations, the diameter of the pipes 150a, 650a may be smaller. In some implementations, the diameter of the pipes 150a, 650a may be larger.

In some implementations, the irrigation system 150, 650 taps into the bottom pressure of fresh water supplies (e.g., Great Lakes in North America; Great Lakes of Africa) for water to be gravity fed and transported into the pipes 150a, 650a. In this way, the irrigation system 150, 650 may be used to distribute fresh potable water for health and hygiene, as well as an emergency drainage system to address flooding, and to increase global agriculture production.

In some implementations, the above system and method generates and utilizes general zero-carbon renewable energy.

The figures, including photographs and drawings, comprised herewith may represent one or more implementations of the system and method for high-velocity ground transportation mobile wind power generation.

Details shown in the figures, such as dimensions, descriptions, etc., are exemplary, and there may be implementations of other suitable details according to the present disclosure.

Reference throughout this specification to "an embodiment" or "implementation" or words of similar import means that a particular described feature, structure, or characteristic is comprised in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations may be depicted in the drawings in a particular order, this should not be understood as requiring that such operations be performed in the particular order shown or in sequential order, or that all illustrated operations be performed, to achieve desirable results.

The invention claimed is:

1. A system for high-velocity ground transportation mobile wind power generation, wherein the system generates and utilizes general zero-carbon renewable energy, the system comprising:

a pathway system comprising one or more pathways wherein each pathway comprises parallel tracks configured to support and guide the transporter;

a transporter configured to travel on a pathway wherein the transporter comprising one or more steam turbines configured to power the transporter to travel on a pathway;

one or more on-board turbine-generators configured to generate electricity on-board the transporter, wherein each on-board turbine-generator:

is installed on-board the transporter;

comprises an on-board turbine operatively connected to an on-board generator; and is configured to generate electricity from an opposing wind force that spins the on-board turbine which resultantly rotates the on-board generator which resultantly generates electricity, wherein the opposing wind force results from the transporter traveling along the pathway of the pathway system; and a plurality of off-board turbine-generators along the pathway system configured to generate electricity off-board the transporter, wherein:

the off-board turbine-generators are installed along the pathway of the pathway system wherein the off-board turbine-generators are spaced apart along the pathway and at least partially submerged underground at a depth that allows the transporter to pass over the off-board turbine-generators when traveling along the pathway;

each of the off-board turbine-generators comprises an off-board turbine operatively connected to an off-board generator and configured to generate electricity from an opposing wind flow velocity that spins the off-board turbine which resultantly rotates the off-board generator which resultantly generates electricity, wherein the opposing wind flow velocity travels under the transporter resulting from the transporter traveling along the pathway of the pathway system and over the off-board turbine-generator.

2. The system of claim 1 wherein the wheelbase of the transporter is at least twenty feet wide.

3. The system of claim 1 wherein the transporter is configured to travel at least six hundred miles per hour.

4. The system of claim 1, wherein a pathway is constructed on an interstate median.

5. The system of claim 1, wherein a pathway is constructed on a federal highway.

6. The system of claim 1, wherein a pathway is constructed on a railroad right of way.

7. The system of claim 1, wherein the steam turbines of the transporter are powered by steam produced on-board the transporter from electricity generated by the on-board turbine-generators and wherein the steam turbines are configured to mechanically power the transporter to travel on the pathway.

8. The system of claim 1 wherein the transporter is at least twenty-four feet in height, forty-three feet in width, and one-hundred and sixteen feet in length.

9. The system of claim 1 wherein the off-board turbine-generators are spaced at least one-hundred feet apart along a pathway and each off-board turbine-generator is positioned in a vertical orientation with the off-board turbine positioned above the off-board generator.

10. The system of claim 1 wherein the on-board turbine of each of the on-board turbine-generators is operatively connected to the respective on-board generator by a direct-driven, a belt-driven, a chain-driven, or a gear-driven connection, and wherein the off-board turbine of each of the off-board turbine-generators is operatively connected to the respective off-board generator by a direct-driven, a belt-driven, a chain-driven, or a gear-driven connection.

11. The system of claim 1, further comprising an irrigation system comprising one or more pipes underground and extending along and adjacent to at least a portion of the pathway, wherein the pipes are configured to carry potable water, irrigation water, or flood drainage water.

12. The system of claim 11 wherein the pipes are at least seventy-two inches in diameter.

13. The system of claim 11 wherein the irrigation system is configure to tap into the bottom pressure of natural fresh water supplies to allow water to be gravity fed and transported through the pipes.

14. A method for high-velocity ground transportation mobile wind power generation, the method comprising:

providing a pathway system comprising one or more pathways wherein each pathway comprises parallel tracks configured to support and guide the transporter;

providing a transporter configured to travel on a pathway wherein the transporter comprising one or more steam turbines configured to power the transporter to travel on a pathway;

providing one or more on-board turbine-generators configured to generate electricity on-board the transporter, wherein each on-board turbine-generator:

is installed on-board the transporter;

comprises an on-board turbine operatively connected to an on-board generator; and is configured to generate electricity from an opposing wind force that spins the on-board turbine which resultantly rotates the on-board generator which resultantly generates electricity, wherein the opposing wind force results from the transporter traveling along the pathway of the pathway system;

providing a plurality of off-board turbine-generators along the pathway system configured to generate electricity off-board the transporter, wherein:

the off-board turbine-generators are installed along the pathway of the pathway system wherein the off-board turbine-generators are spaced apart along the pathway and at least partially submerged underground at a depth that allows the transporter to pass over the off-board turbine-generators when traveling along the pathway;

each of the off-board turbine-generators comprises an off-board turbine operatively connected to an off-board generator and configured to generate electricity from an opposing wind flow velocity that spins the off-board turbine which resultantly rotates the off-board generator which resultantly generates electricity, wherein the opposing wind flow velocity travels under the transporter resulting from the transporter traveling along the pathway of the pathway system and over the off-board turbine-generator;

generating electricity on-board the transporter by operating the transporter to travel along the pathway thereby causing an opposing wind force to spin the on-board turbines which thereby rotate the respective on-board generators which thereby generate electricity on-board the transporter; and generating electricity off-board the transporter along the pathway by operating the transporter along the pathway thereby causing an opposing wind flow velocity to spin the off-board turbines which thereby rotate the respective off-board generators which thereby generate electricity off-board the transporter along the pathways.

15. The method of claim 14 further comprising:
providing an irrigation system comprising one or more pipes underground and extending along and adjacent to at least a portion of the pathway, wherein the pipes are configured to carry potable water, irrigation water, or flood drainage water;
tapping the irrigation system to the bottom pressure of natural fresh water supplies to allow water to be gravity fed and transported through the pipes; and
transporting potable water, irrigation water, or flood drainage water through the irrigation system.

* * * * *